(12) United States Patent
Gregory et al.

(10) Patent No.: US 11,352,151 B2
(45) Date of Patent: Jun. 7, 2022

(54) FLUID TRANSFER SYSTEM

(71) Applicant: AIRBUS DEFENCE AND SPACE LIMITED, Stevenage (GB)

(72) Inventors: Juliet Gregory, Stevenage (GB); James Sadler, Stevenage (GB); William Bentall, Stevenage (GB)

(73) Assignee: AIRBUS DEFENCE AND SPACE LIMITED, Stevenage (GB)

( * ) Notice: Subject to any disclaimer, the term of this patent is extended or adjusted under 35 U.S.C. 154(b) by 0 days.

(21) Appl. No.: 17/427,272

(22) PCT Filed: Jan. 23, 2020

(86) PCT No.: PCT/EP2020/051691
§ 371 (c)(1),
(2) Date: Jul. 30, 2021

(87) PCT Pub. No.: WO2020/156931
PCT Pub. Date: Aug. 6, 2020

(65) Prior Publication Data
US 2022/0089300 A1   Mar. 24, 2022

(30) Foreign Application Priority Data

Jan. 31, 2019 (EP) .................................... 19154848

(51) Int. Cl.
*B64G 1/40* (2006.01)
*B64G 1/64* (2006.01)
(52) U.S. Cl.
CPC ............. *B64G 1/402* (2013.01); *B64G 1/646* (2013.01)

(58) Field of Classification Search
CPC ................................ B64G 1/402; B64G 1/646
See application file for complete search history.

(56) References Cited

U.S. PATENT DOCUMENTS

| 7,257,940 B1* | 8/2007 | Knight | F04B 43/0736 60/259 |
| 2001/0023710 A1* | 9/2001 | Tung Kong | B64G 1/402 137/572 |

(Continued)

OTHER PUBLICATIONS

International Search Report and Written Opinion in corresponding International Patent Application No. PCT/EP2020/051691, dated May 8, 2020, 13 pages.

*Primary Examiner* — Tye William Abell
(74) *Attorney, Agent, or Firm* — FisherBroyles, LLP; Robert Kinberg

(57) ABSTRACT

A system for transferring a fluid from a first spacecraft to a second spacecraft. The first spacecraft includes a fluid transfer system comprising: a pressurant supply system, a first fluid tank to store a fluid to be transferred, one or more transfer feedlines to provide fluidic connection between the first fluid tank and the second spacecraft, a connector for connecting the first spacecraft to the second spacecraft, an accumulator tank comprising a first portion connected to the pressurant supply system, a second portion configured in fluidic communication with the one or more transfer feedlines, and a flexible separator to separate the first portion and the second portion. The pressurant supply system supplies pressurant gas to the first fluid tank for pressurising the first fluid tank and to supply pressurant gas to the first portion of the accumulator tank for pressurising the first portion of the accumulator tank.

15 Claims, 6 Drawing Sheets

(56) References Cited

U.S. PATENT DOCUMENTS

2012/0000575 A1\* 1/2012 Yandle ................... B64G 1/402
 141/98
2012/0325972 A1\* 12/2012 Gryniewski ............. B64G 1/14
 244/172.5

\* cited by examiner

FLUID TRANSFER SYSTEM

CROSS-REFERENCE TO RELATED APPLICATIONS

This application is a United States National Stage Application of International Application No. PCT/EP2020/051691 filed Jan. 23, 2020, claiming priority from European Application No. 19154848.6 filed Jan. 31, 2019.

FIELD OF THE INVENTION

The present invention relates generally to a fluid transfer system for a spacecraft and a method of transferring fluid from a first spacecraft to a second spacecraft.

BACKGROUND

The concept of transferring fluid in space is known. In particular, the transfer of propellant in space may be carried out through the use of pressure or via a pump and fluid transfer systems, which can be, for example, found on the International Space Station (ISS).

However, these known systems are not considered "clean" as they purge propellant into space. Purging of fluid, such as propellant, into space can create contamination risks to the spacecraft, may result in coating of instruments, and can even alter the thermal properties of the external surfaces.

Therefore, there is a need to create a system for transferring fluid in space which does not require purging of the fluid into space.

US 2012325972 discloses a robotic satellite refuelling tool and U.S. Pat. No. 7,257,940 discloses a device and method for pumping a fluid.

SUMMARY OF THE INVENTION

According to a first aspect of the invention, there is provided a system for transferring a fluid from a first spacecraft to a second spacecraft, the first spacecraft comprising a fluid transfer system comprising: a pressurant supply system; a first fluid tank configured to store a fluid to be transferred, one or more transfer feedlines configured to provide fluidic connection between the first fluid tank and the second spacecraft, a connector for connecting the first spacecraft to the second spacecraft, an accumulator tank comprising: a first portion connected to the pressurant supply system, a second portion configured to be in fluidic communication with the one or more transfer feedlines, and a flexible separator arranged to separate the first portion and the second portion; wherein the pressurant supply system is arranged to supply pressurant gas to the first fluid tank for pressurising the first fluid tank and to supply pressurant gas to the first portion of the accumulator tank for pressurising the first portion of the accumulator tank.

In some embodiments, the accumulator tank according to the first aspect is configured such that a pressure of the second portion is adjusted by modifying a pressure of the first portion.

In some embodiments, the connector according to the first aspect comprises a robotic arm, and wherein the robotic arm comprises rigid piping and/or flexible piping and the one or more transfer feedlines pass through the robotic arm.

In some embodiments, the connector according to the first aspect comprises a dedicated docking interface.

According to a second aspect of the invention, there is provided a computer program, which when executed by a computer, cause the computer, when connected to a system according to the first aspect, to cause the system to perform the steps comprising: priming the fluid transfer system by releasing fluid from the first fluid tank into the one or more transfer feedlines and the second portion of the accumulator tank; connecting the first spacecraft to the second spacecraft; transferring fluid from the first spacecraft to the second spacecraft; adjusting the pressure of the one or more transfer feedlines by adjusting a pressure of the first portion of the accumulator tank; and disconnecting the first spacecraft from the second spacecraft.

In some embodiments, the step of priming the fluid transfer system comprises releasing fluid from the first fluid tank such that a pressure of the first fluid tank, a pressure of the one or more transfer feedlines, and a pressure of the accumulator tank are equal.

In some embodiments, the step of adjusting the pressure of the one or more transfer feedlines is performed prior to the step of connecting the first spacecraft to the second spacecraft and/or prior to the step of disconnecting the first spacecraft from the second spacecraft.

In some embodiments, the first fluid tank is isolated by closing a valve located between the first fluid tank and the one or more transfer feedlines prior to the step of adjusting the pressure of the one or more transfer feedlines.

In some embodiments, the accumulator tank is isolated by closing a valve located between the second portion of the accumulator tank and the one or more transfer feedlines prior to the step of transferring fluid from the first spacecraft to the second spacecraft.

In some embodiments, increasing a pressure of the second portion of the accumulator tank and the one or more transfer feedlines comprises pressurising the first portion of the accumulator tank by releasing a pressurant gas from the pressurant supply system.

In some embodiments, decreasing a pressure of the second portion of the accumulator tank and the one or more transfer feedlines comprises venting pressurant gas from the first portion of the accumulator tank by opening one or more valves connected to a venting port.

In some embodiments, the fluid transfer system further comprises a robotic arm, and wherein the one or more transfer feedlines pass through the robotic arm.

In some embodiments, prior to the step of connecting the first spacecraft to the second spacecraft and/or prior to the step of disconnecting the first spacecraft from the second spacecraft, the first portion of the accumulator tank is depressurised in order to decrease the pressure of the transfer feedlines to about 2 bar.

In some embodiments, the pressure required to transfer the fluid is determined by measuring the pressure in the first fluid tank, determining a pressure of a second fluid tank located on the second spacecraft and configured to receive the fluid from the first fluid tank and adjusting the pressure of the fluid transfer system to be greater than the pressure of the second fluid tank through use of a pressurant supply system.

In some embodiments, the computer program comprises further instructions, which when executed by the computer, cause the computer, when connected to a system, to perform the step of transferring fluid to a third spacecraft by repeating all steps of the second aspect except the priming step.

BRIEF DESCRIPTION OF THE DRAWINGS

Embodiments of the present invention will now be described, by way of example, with reference to the accompanying drawings, in which.

DETAILED DESCRIPTION

Figure 1:
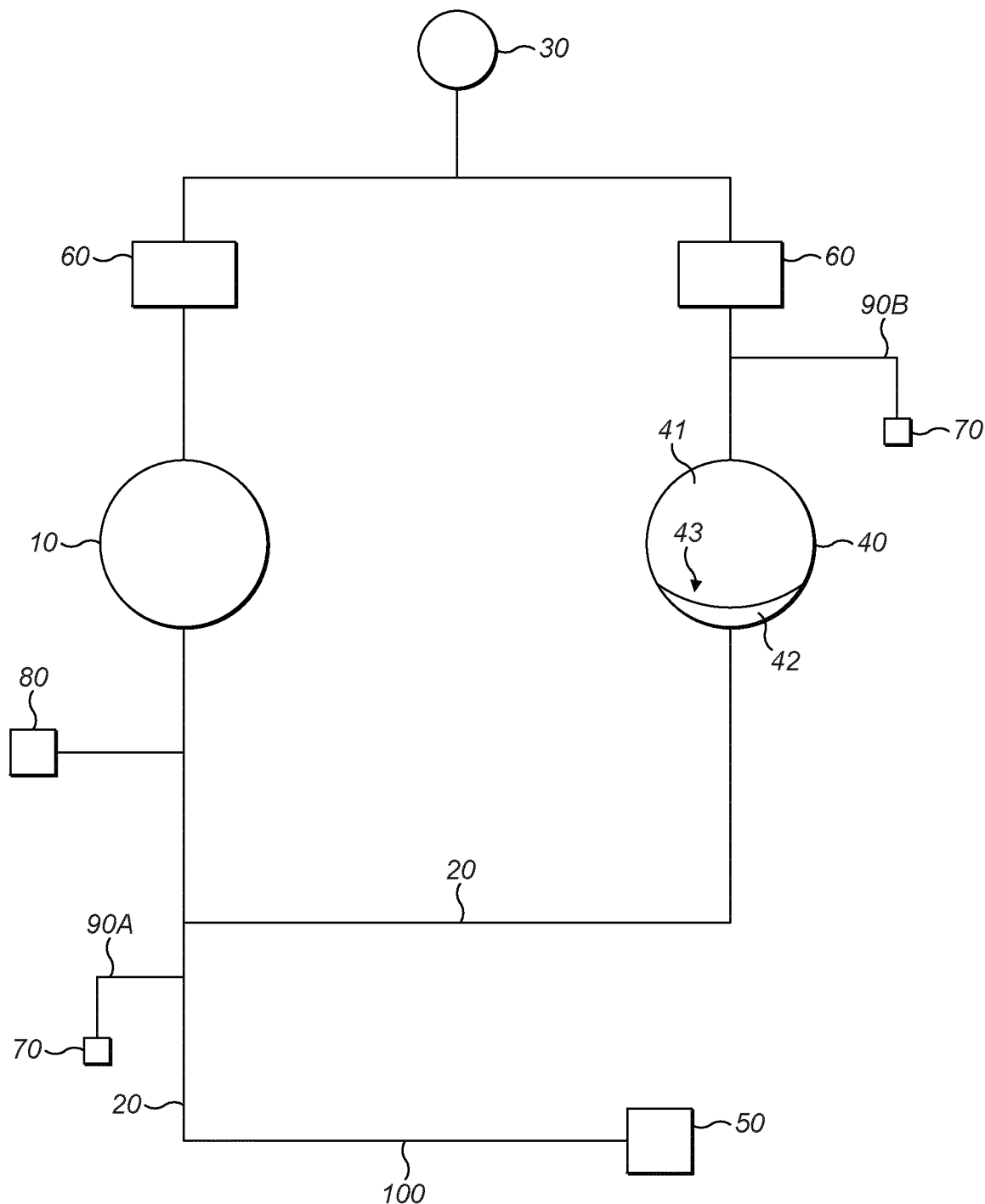
FIG. 1 illustrates a system for transferring fluid.

FIG. 1 illustrates a system for transferring fluid from a first spacecraft to a second spacecraft. The system comprises a fluid transfer system comprising a first fluid tank 10 configured to store a fluid to be transferred. Transfer feedlines 20 provide a fluidic connection between the first fluid tank 10 and the second spacecraft (not shown). A pressurant supply system 30 is arranged to supply pressurant gas to the first fluid tank 10 in order to pressurise the first fluid tank 10 and is also connected to an accumulator tank 40. The system additionally comprises a connector 50 for connecting the first spacecraft to the second spacecraft, electronic pressure regulators 60, venting ports 70, a propulsion system 80 for manoeuvring the first spacecraft, and evacuation lines 90A and 90B. The system also comprises a robotic arm 100, through which transfer feedlines 20 pass.

In some embodiments, the fluid contained within the first fluid tank 10 is a liquid.

In some embodiments the first fluid tank 10 comprises propellant. Therefore, the first fluid tank 10 may be referred to as a propellant storage tank. When the first fluid tank 10 comprises propellant, it may be used as the source of propellant for manoeuvring the first spacecraft in addition to storing the propellant to be transferred. Examples of propellants include: mixed oxides of nitrogen, such as 3% nitric oxide, monomethyl hydrazine, and hydrazine.

In some embodiments, the first fluid tank 10 comprises one or more test ports for on ground testing and flight pressurisation. Preferably, each test port is of the three barrier type, in order to comply with launch site ground safety requirements.

In some embodiments, the first fluid tank 10 may be isolated from the rest of the system. For example, during non-propellant transfer phases, the fluid contained in the first fluid tank 10 is isolated from the transfer feedlines by means of valves (not shown), such as flow controlling solenoid valves and latch valves.

In some embodiments, the first fluid tank 10 may be pressurised. For example, the first fluid tank may be pressurised to about 10 bar.

The transfer feedlines 20 are configured to direct the flow of fluid from the first fluid tank 10 to either the second spacecraft or to the accumulator tank 40.

In some embodiments, the transfer feedlines 20 comprise valves (not shown) and an orifice (not shown) downstream of the first fluid tank 10. Valves, such as solenoid valves may be used to isolate distinct parts of the fluid transfer system.

Furthermore, in some embodiments, a fill and drain valve located on the transfer feedlines 20 may also be used for ground testing of the transfer feedlines 20.

In some embodiments, a filter (not shown) may be incorporated in the transfer feedlines 20 upstream of any valves, in order to protect any downstream valve seats and avoid clogging any flow orifices.

In some embodiments, a low pressure transducer is located downstream of the first fluid tank 10 and provides accurate pressure monitoring of the fluid exiting the tank 10.

In some embodiments, the first spacecraft is connected to the second spacecraft through the use of a robotic arm 100. When a robotic arm 100 is present, the transfer lines 20 are routed through the robotic arm 100.

In some embodiments, the first spacecraft is connected to the second spacecraft through the use of a dedicated docking interface which is configured to dock the first spacecraft with the second spacecraft and also make the fluidic connection between the two spacecraft at the same time as docking.

In some embodiments, the straight arm sections of the robotic arm 100 are equipped with hard piping and flexible piping is employed around the joints. The pressure in the transfer feedlines passing through the robotic arm can cycle between about 2 bar and 15 bar.

In some embodiments, the entire length of the robotic arm 100 comprises hard/rigid piping. In other embodiments, the entire length of the robotic arm 100 comprises flexible piping.

The pressurant supply system 30 comprises a pressurant storage tank and a pressurant gas, such as helium. The pressurant supply system 30 is configured to pressurise the first fluid tank 10 and the accumulator tank 40.

In some embodiments, the pressurant supply system 30 may be equipped with a high pressure transducer (HPT) for pressure monitoring and a fill and drain valve for on ground testing and in-flight pressurant loading.

In some embodiments, the pressurant supply system may be isolated from the rest of the system by means of an isolation valve, such as a shaped memory alloy (SMA) valve. This isolation allows on ground testing of the low volume sections without the need to pressurise the pressurant tank and also provides a barrier separating high pressure and low pressure sections.

The accumulator tank comprises a first portion 41 connected to the pressurant supply system 30, a second portion 42 configured to be in fluidic communication with the transfer feedlines 20, and a flexible separator 43 arranged to physically separate the first portion 41 and the second portion 42 such that the first portion 41 is not contaminated with propellant vapour.

In some embodiments, the flexible separator 43 comprises a metallic or polymeric material, such as stainless steel, aluminium, titanium, polytetrafluoroethylene (PTFE) or ethylene propylene diene monomer rubber (EPDM).

In some embodiments, the flexible separator is similar to a bellows or a diaphragm.

In other embodiments, the flexible separator is similar to a piston.

In some embodiments, the accumulator tank 40 is configured to provide a buffer volume for initial system priming.

In some embodiments, the accumulator tank 40 is configured to increase and decrease the pressure in the transfer feedlines 20 by pressurisation and depressurisation of the first portion 41. Altering the pressure in the transfer feedlines 20 in this way eliminates the need for purging fluid in the transfer feedlines 20 into space.

In some embodiments, the accumulator tank 40 is configured to ensure that any pressurant gas vented in close proximity to the second spacecraft is not contaminated with vapour from the fluid to be transferred, thereby ensuring a "clean space" approach.

In some embodiments, the pressure throughout the system may be regulated through the use of two electronic pressure regulators (EPRs), one for the first fluid tank 10 and one for the accumulator tank 40.

EPRs permit simple pressure regulation throughout the mission lifetime and are advantageous because the set point of the regulator can be changed as required at any stage of the mission. As a result of this, the pressure of the first fluid tank 10 can be altered to cater for thruster operation, i.e. rendezvous manoeuvres, or transferring fluid as required.

In some embodiments, each EPR comprises: a number of test ports for ground testing and flight pressurisation; pressure transducers for pressure sensing for operation of the electronic pressure regulator and pressure monitoring for health checks; and dual solenoid valves to provide the regulation capability, which also act to provide barriers separating high pressure and low pressure sections.

In some embodiments, the mission pressurant requirement is achieved by storing pressurant gas at high pressure in the pressurant storage tank. The high pressure may be regulated down to the operational pressure of the first fluid tank 10 and accumulator tank 40.

In some embodiments, the EPRs are isolated from the first fluid tank 10 and the accumulator tank 40 by means of an isolation valve, such as a shaped memory alloy isolation valve. This isolation valve enables on ground testing of the pressure regulation section to be carried out without the need to pressurise the tank sections.

In some embodiments, the fluid transfer system has two pressure regulators. Their function is to reduce the high pressure in the pressurant storage tank to the lower pressure required for the downstream components, such as the tanks, fill-drain valve connectors and the robotic arm, and supply this pressure on demand.

As illustrated in FIG. 1, the system comprises two evacuation lines 90A and 90B. A first evacuation line 90A is in fluidic communication with the transfer feedlines 20 and a second evacuation line 90B is in fluidic communication with the first portion 41 of the accumulator tank 40.

The evacuation lines 90A and 90B work in combination with the venting ports 70 to provide initial evacuation of the propellant transfer feedlines to clear the lines of pressurant gas before propellant priming, and to provide a means to reduce the pressure in the first portion 41 of the accumulator tank 40, thus reducing the pressure in the second portion 42 of the accumulator tank 40 and the transfer feedlines 20.

In some embodiments, the propulsion system 80 comprises a chemical propulsion system designed to assist with manoeuvring the first spacecraft and with rendezvous manoeuvers.

In some embodiments, the chemical propulsion system is a bipropellant system which is fueled by propellant from the first fluid tank 10. Preferably, the propellant is supplied to the propulsion system 80 downstream of a propellant tank filter in order to protect downstream valve seats. The merging of the refuelling and propulsion systems allows provision of the propulsion functionality with the addition of minimal components, therefore reducing costs.

In some embodiments, the propulsion system 80 comprises dual valve thrusters.

In some embodiments, the propulsion system 80 comprises latch valves which act to isolate the propulsion system from the refuelling system.

In some embodiments, the second spacecraft is one that is in orbit and not designed to receive fluid after launch. In such situations, an adaptor may be required in order to make the fluidic connection between the two spacecraft.

In some embodiments, the second spacecraft is configured to receive fluid and therefore the adaptor will not be needed.

Certain components, such as the connector between the first spacecraft and the second spacecraft, and the robotic arm, may be pressure sensitive. In particular, these components may only be operable at low pressures. For example, fluid stored in the first fluid tank 10 may be at a high pressure of about 10 bar or about 15 bar. Once a valve located between the first fluid tank 10 and the transfer feedlines 20 has been opened, the relatively high pressure of the first fluid tank 10 pressurises the transfer feedlines 20 and the second portion 42 of the accumulator tank 40 to about the same pressure as the first fluid tank 10, i.e. about 10 bar or about 15 bar. However, the connector between the first spacecraft and the second spacecraft may be unable to provide a fluidic connection between the two spacecraft when pressurised to such a high degree. Furthermore, once fluid has been transferred to a second spacecraft, the pressure at the connector may be too high for the connector to disconnect. In particular, the pressure at the connector after transferring fluid may be at about 10 bar or about 15 bar; however, in order to disconnect from the second spacecraft, the pressure at the connector must be lowered to about 2 bar.

Thus, throughout the lifetime of the spacecraft, there is a need to operate the system at a variety of pressures.

The accumulator tank enables the pressure in the transfer feedlines to be altered without purging fluid into space.

For example, the increase and decrease in pressure in the transfer feedlines is modified through the pressurisation and depressurisation of the first portion 41 of the accumulator tank 40. In particular, in order to decrease the pressure of the transfer feedlines 20, pressurant gas from the first portion 41 of the accumulator tank 40 is vented through the evacuation line 90B. Such venting results in a decrease in pressure in the first portion 41 of the accumulator tank 40. In order to increase the pressure in the transfer feedlines 20, the operation is reversed. Therefore, when an increase of pressure is desired, pressurant gas is introduced into the first portion 41 of the accumulator tank 40.

In some embodiments, depressurisation of the first portion 41 of the accumulator tank 40 occurs while the first spacecraft is connected to the second spacecraft.

In some embodiments, the robotic arm may be required to be under low pressure, e.g. about 2 bar, in order to move.

Figure 2A:
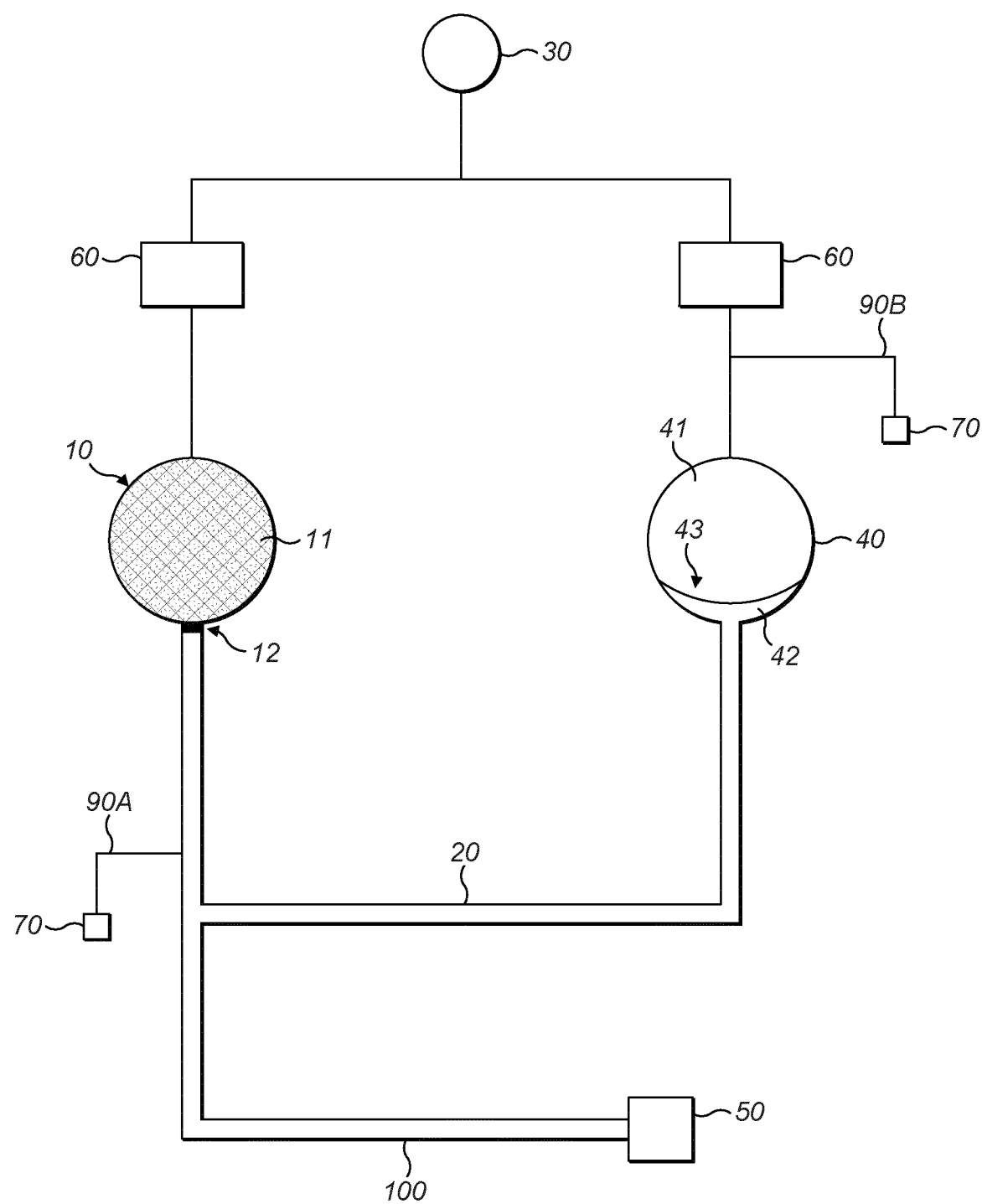
FIG. 2A illustrates a system for transferring fluid prior to launch.

FIG. 2A represents a simplified system of that depicted in FIG. 1 and illustrates the fluid transfer system at launch. In particular, the system comprises a first fluid tank 10 full of a fluid 11.

Preferably, the pressure of this tank is at about 10-12 bar, so that the tank 10 is able to withstand the pressures experienced during launch.

The first fluid tank is isolated from the rest of the transfer system through use of a valve 12, such as a solenoid valve. The transfer feedlines 20 are preferably kept pressurised at a low pressure with a pressurant gas, such as helium. This minimises the effect of any potential failures on these sections.

The flexible separator 43 in the accumulator tank 40 is in a contracted state and the first portion of the accumulator tank is pressurised with pressurant gas. Preferably, the first portion of the accumulator tank is pressurised to a pressure of about 2-5 bar.

In some embodiments, prior to priming the fluid transfer system for the first time, a system health check may be performed on the fluid transfer system by means of pressure and temperature telemetry to verify that no failures have occurred during launch resulting in leakage of the system.

Prior to priming, the transfer feedlines are evacuated of any pressurant gas by opening evacuation line 90A in fluidic connection with the transfer feedlines.

Figure 2B:
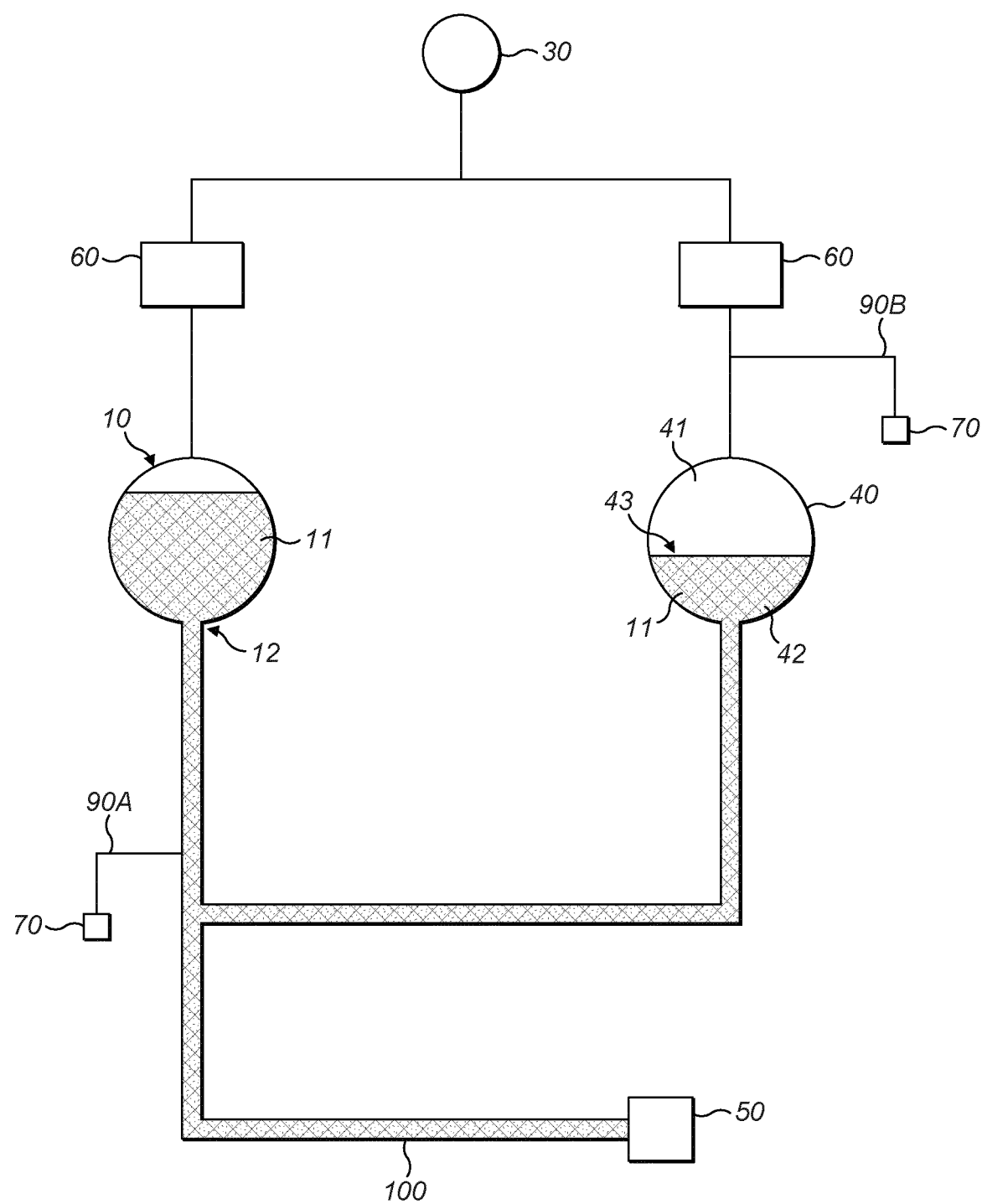
FIG. 2B illustrates a system for transferring fluid after priming the transfer feedlines.

FIG. 2B shows the fluid transfer system after initial priming. In particular, valve 12 has been opened, allowing fluid 11 to flow from the first fluid tank 10 into the transfer feedlines 20 and the second portion 42 of the accumulator tank 40.

Due to the high pressure in the first fluid tank of about 10-12 bar, once the valve 12 has been opened, the transfer feedlines 20, the second portion 42 of the accumulator tank 40, and the first portion 41 of the accumulator tank 40 are pressurised to an equal pressure. Alternatively, once the valve 12 has been opened, the pressures of the first fluid tank 10, the transfer feedlines 20, and the first 41 and second portion 42 of the accumulator tank 40 are in equilibrium. Therefore, once the valve 12 has been opened and the system has been primed, the pressure in the transfer feedlines 20 and the first portion 41 and second portion 42 of the accumulator tank 40 is about 10 bar.

In some embodiments, the flowrate of fluid leaving the first fluid tank 10 with the duty cycle of solenoid valves located downstream of the first fluid tank 10.

The flexible separator 43 located within the accumulator tank 40 has expanded in response to the increase of fluid and pressure in the second portion 42 of the accumulator tank 40.

Once the pressure of the fluid in the transfer feedlines 20 and the second portion 42 of the accumulator tank 40 are equal to the pressure of the fluid in the first fluid tank 10, the first fluid tank 10 is isolated from the rest of the system by closing the valve 12. At this stage, a leak check may be performed.

Figure 2C:
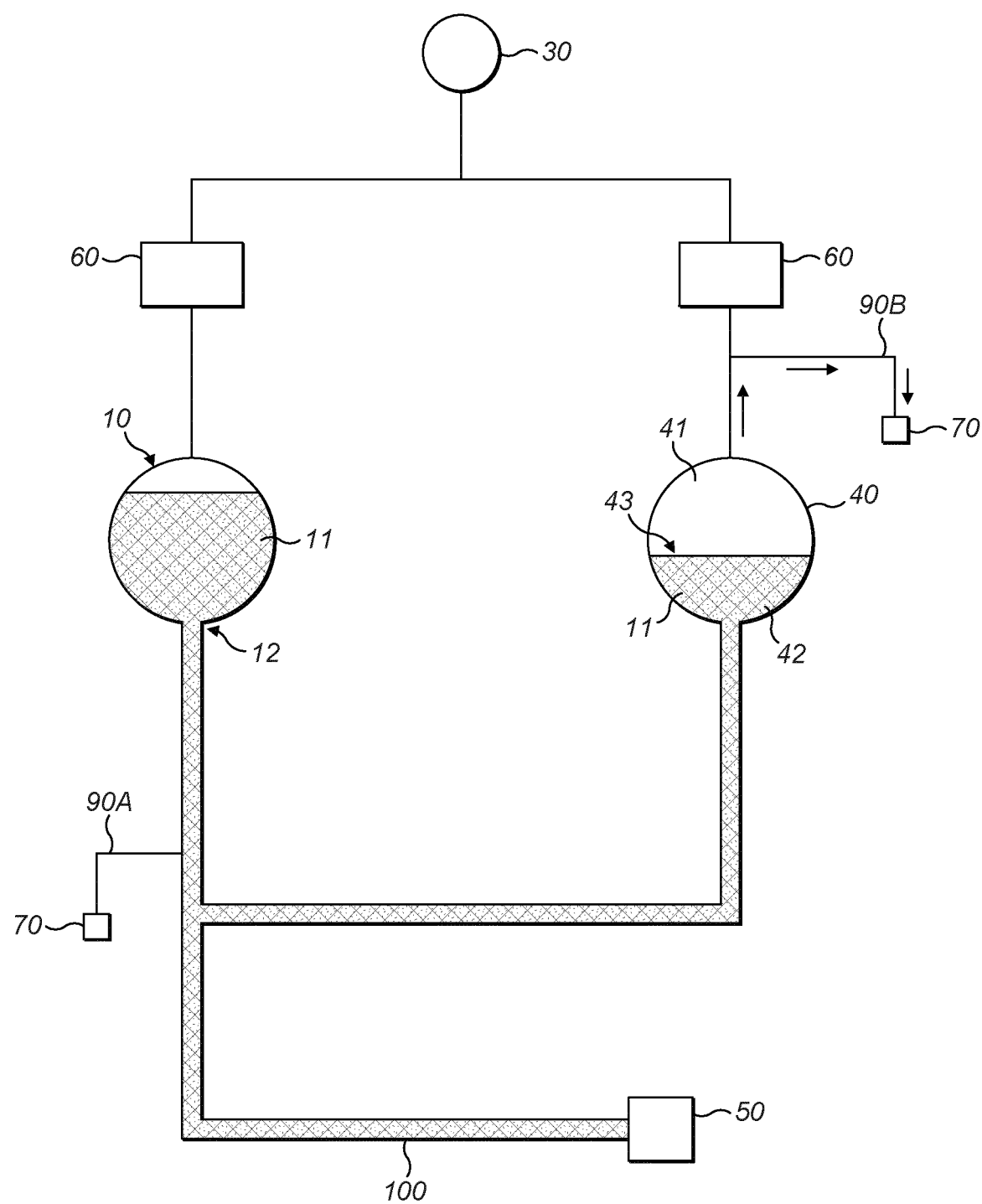
FIG. 2C illustrates a system for transferring fluid during pressure adjustment.

Once the primed sections are confirmed to be leak tight, the pressure in the transfer feedlines 20 is reduced to about 2 bar, as shown in FIG. 2C. This is achieved by venting pressurant gas (see arrows) from the first portion 41 of the accumulator tank 40 and therefore decreasing the pressure in the transfer feedlines 20. Once the pressure in the transfer feedlines 20 is about 2 bar, the first spacecraft is able to remain in this state until a second spacecraft requires the transfer of fluid. This stage may be called "waiting mode".

Once the pressure in the transfer feedlines 20 is about 2 bar, the first spacecraft is able to make a fluidic connection with a second spacecraft.

After fluidic connection is achieved, the transfer feedlines 20 are re-pressurised. In order to re-pressurise the transfer feedlines 20, pressurant gas is introduced into the first portion 41 of the accumulator tank 40, thereby increasing the pressure in the first portion 41, thus increasing the pressure in the transfer feedlines 20.

Once the transfer feedlines 20 are re-pressurised, the accumulator tank is isolated from the rest of the transfer system through the use of a valve, such as a solenoid valve.

Before the system is ready to transfer fluid to the second spacecraft, the optimum pressure for transferring must be determined. In particular, the pressure required is dependent on the pressure, volume, and fill ratio of the tank on the second spacecraft, the volume, and fill ratio of the first fluid tank 10, and the quantity of fluid to be transferred. In some embodiments, this is achieved by determining the pressure in a tank located on the second spacecraft and configured to receive the fluid. Once this pressure is determined, the pressure in the first fluid tank and the transfer feedlines is set. This is achieved by introducing pressurant gas to the first fluid tank.

In some embodiments, the pressure of the fluid in the transfer feedlines 20 is pressurised to 1 bar greater than the tank on the second spacecraft. This ensures a positive pressure gradient from the first spacecraft to the second spacecraft.

Fluid may be transferred in two modes, regulated and/or blowdown, depending on the initial delta pressure between the two spacecraft.

In some embodiments, where there is sufficient pressure delta to perform the complete transfer of fluid, the fluid will be transferred in blowdown mode and the flowrate may be controlled by the valves located directly downstream of the first fluid tank 10.

In some embodiments, the pressure of the tank located on the second spacecraft will be provided through spacecraft telemetry from the second spacecraft.

In some embodiments, if the initial delta pressure is just sufficient to achieve the desired flowrate, the fluid will be transferred in regulated mode, with an EPR maintaining the delta pressure. When the bulk of the required quantity of fluid has been transferred, the remainder of the fluid shall be transferred in blowdown mode and fluid transfer shall automatically stop when the first fluid tank 10 and the tank on the second spacecraft are at equilibrium. The pressure at which this occurs shall be predetermined by analysis.

In some embodiments, the initial delta pressure may be greater than necessary to initiate transfer of fluid but not sufficient to complete the transfer, the fluid shall be transferred in blowdown mode until the pressure to maintain the desired flowrate is achieved. Once this occurs, an EPR may be activated to maintain the delta pressure and when the bulk of the required quantity of fluid has been transferred, the remainder of fluid can be transferred in blowdown mode.

In order to transfer fluid from the first spacecraft to the second spacecraft, once the pressure has been optimised, a valve is opened. Fluid may then be transferred to the second spacecraft by either blowdown or pressure regulated, as described hereinabove.

In some embodiments, the flowrate of fluid to be transferred is about 5 cm3/s. When the fluid is transferred at a flow rate of about 5 cm3/s, it is easier to maintain a stable flow, thermal conditions, and allow accurate pressure monitoring.

Fluid transfer shall cease when the tank on the second spacecraft reaches a predetermined value, indicating that the required quantity of fluid has been transferred.

Once the desired amount of fluid is transferred to the second spacecraft, the valve may be closed. However, in order to disconnect the first spacecraft from the second spacecraft there is a need to decrease the pressure in the transfer feedlines. This is because specific components, such as the connector and the robotic arm cannot be moved whilst under high pressure. Therefore, the first spacecraft cannot disconnect from the second spacecraft until the pressure has been decreased. The pressure in the transfer feedlines is decreased by venting pressurant gas from the first portion of the accumulator tank as described above. When the pressure in the transfer feedlines has decreased to about 2 bar, the first spacecraft is able to disconnect from the second spacecraft.

The first spacecraft now remains in "waiting mode" until connecting to a third spacecraft.

Figure 3:
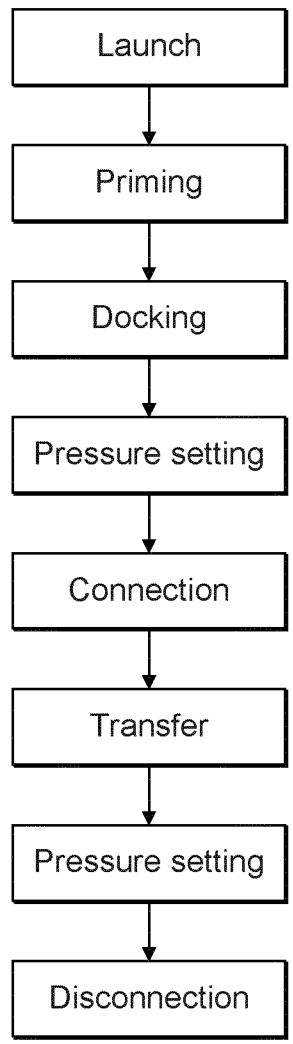
FIG. 3 illustrates a method of transferring fluid.

A method for transferring fluid from a first spacecraft to a second spacecraft is illustrated in FIG. 3.

The method comprises launching the spacecraft and priming the transfer feedlines, as set out hereinabove. Once the transfer feedlines are primed, the first spacecraft is able to dock with the second spacecraft. This represents the safest mode of operation and allows the system to be primed and checked for leaks before putting a second spacecraft at risk.

In alternative embodiments, the first spacecraft docks with the second spacecraft prior to priming the transfer feedlines. In some embodiments, docking may be carried out by any known means and is carried out at a location remote from the fluid transfer system. In other embodiments, docking may be carried out via a dedicated docking interface which is capable of making a fluidic connection during the docking process. In such embodiments, the docking will be located at essentially the same location as where the fluidic connection is made. The pressure in the transfer feedlines is reduced and a fluidic connection is made between the first spacecraft and the second spacecraft. Prior to transferring fluid, the desired pressure is determined and the pressure in the fluid transfer system is adjusted accordingly, if necessary. Fluid may now be transferred from the first spacecraft to the second spacecraft. Once a predetermined amount of fluid has been transferred, the pressure in the transfer feedlines is reduced to allow the first spacecraft and the second spacecraft to disconnect.

Figure 4:
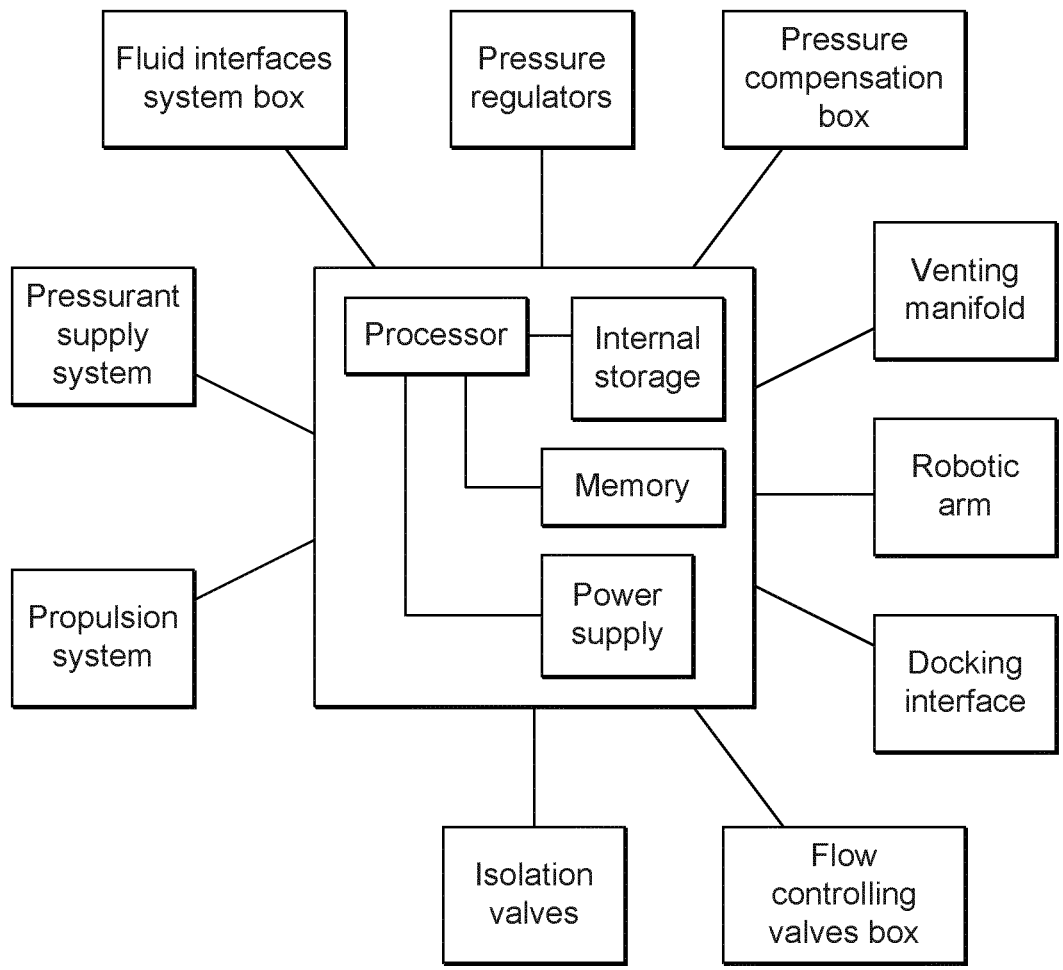
FIG. 4 illustrates a processor for a system for transferring fluid.

In some embodiments, the above method may be implemented by one or more processors, as illustrated in FIG. 4. Other implementations may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

While the present invention has been particularly shown and described with reference to the embodiments set out above, it will be understood by those of ordinary skill in the art that various changes in form and details may be made therein without departing from the scope of the present invention as defined by the appended claims. References to "an embodiment" should not be construed as limiting the corresponding disclosure to the same specific embodiment, and the present invention encompasses combinations of features of compatible embodiments, as would be understood by the skilled person.

The invention claimed is:

1. A fluid transfer system for use in a first spacecraft for transferring a fluid from the first spacecraft to a second spacecraft, comprising:
    a pressurant supply system;
    a first fluid tank configured to store a fluid to be transferred, one or more transfer feedlines configured to provide fluidic connection between the first fluid tank and the second spacecraft, a connector for connecting the first spacecraft to the second spacecraft, an accumulator tank comprising:
    a first portion connected to the pressurant supply system, a second portion configured to be in fluidic communication with the one or more transfer feedlines, and a flexible separator arranged to separate the first portion and the second portion;
    wherein the pressurant supply system is arranged to supply pressurant gas to the first fluid tank for pressurising the first fluid tank and to supply pressurant gas to the first portion of the accumulator tank for pressurising the first portion of the accumulator tank.

2. The fluid transfer system according to claim 1, wherein the accumulator tank is configured such that a pressure of the second portion is adjusted by modifying a pressure of the first portion.

3. The fluid transfer system according to claim 1, wherein the connector comprises a robotic arm, and wherein the robotic arm comprises rigid piping and/or flexible piping and the one or more transfer feedlines pass through the robotic arm.

4. The fluid transfer system according to claim 1, wherein the connector comprises a dedicated docking interface.

5. The fluid transfer system according to claim 1, wherein the fluid transfer system further comprises a robotic arm, and wherein the one or more transfer feedlines pass through the robotic arm.

6. A computer program comprising instructions which, when executed by a computer, cause the computer, when connected to a system according to claim 1, to cause the system to perform the steps comprising:
    priming the fluid transfer system by releasing fluid from the first fluid tank into the one or more transfer feedlines and the second portion of the accumulator tank;
    connecting the first spacecraft to the second spacecraft;
    transferring fluid from the first spacecraft to the second spacecraft;
    adjusting the pressure of the one or more transfer feedlines by adjusting a pressure of the first portion of the accumulator tank; and
    disconnecting the first spacecraft from the second spacecraft.

7. The computer program according to claim 6, wherein the step of priming the fluid transfer system comprises releasing fluid from the first fluid tank such that a pressure of the first fluid tank, a pressure of the one or more transfer feedlines, and a pressure of the accumulator tank are equal.

8. The computer program according to claim 6, wherein the computer program further causes the system to isolate the first fluid tank by closing a valve located between the first fluid tank and the one or more transfer feedlines prior to the step of adjusting the pressure of the one or more transfer feedlines.

9. The computer program according to claim 6, wherein the computer program further causes the system to isolate the accumulator tank by closing a valve located between the second portion of the accumulator tank and the one or more transfer feedlines prior to the step of transferring fluid from the first spacecraft to the second spacecraft.

10. The computer program according to claim 6, wherein the fluid transfer system further comprises a robotic arm, and the one or more transfer feedlines pass through the robotic arm, and prior to at least one of a) the step of connecting the first spacecraft to the second spacecraft and b) the step of disconnecting the first spacecraft from the second spacecraft, the computer program causes the system to depressurize the first portion of the accumulator tank in order to decrease the pressure of the transfer feedlines substantially 2 bar.

11. The computer program according to claim 6, wherein the computer program causes the system to determine the pressure required to transfer the fluid by measuring the pressure in the first fluid tank, determine a pressure of a second fluid tank located on the second spacecraft and to receive the fluid from the first fluid tank and adjust the pressure of the fluid transfer system to be greater than the pressure of the second fluid tank through use of a pressurant supply system.

12. The computer program according to claim 6, wherein the computer program causes the system to transfer fluid to a third spacecraft by repeating all said steps except the priming step.

13. The computer program according to claim 6, wherein the step of adjusting the pressure of the one or more transfer feedlines is performed prior to the step of connecting the first spacecraft to the second spacecraft and/or prior to the step of disconnecting the first spacecraft from the second spacecraft.

14. The computer program according to claim 13, wherein the computer program causes the system to increase pressure of the second portion the accumulator tank and the one or more transfer feedlines by causing a release of the pressurant gas from the pressurant supply system to pressurize the first portion of the accumulator tank.

15. The computer program according to claim 13, wherein the computer program causes the system to decrease a pressure of the second portion of the accumulator tank and the one or more transfer feedlines by opening one or more valves connected to a venting port to vent pressurant gas from the first portion.

\* \* \* \* \*